US012679154B1

(12) United States Patent
Klein et al.

(10) Patent No.: US 12,679,154 B1
(45) Date of Patent: Jul. 14, 2026

(54) PNEUMATIC TRAILING BEAM SUSPENSION WITH A BOLTED AXLE CONNECTION, THUS WITHOUT WELDING THE AXLE TO THE TRAILING ARM-BEAMS

(71) Applicants: Jason M. Klein, Springfield, MO (US); Kevin C. Schlack, Ozark, MO (US)

(72) Inventors: Jason M. Klein, Springfield, MO (US); Kevin C. Schlack, Ozark, MO (US)

( * ) Notice: Subject to any disclaimer, the term of this patent is extended or adjusted under 35 U.S.C. 154(b) by 0 days.

(21) Appl. No.: 19/279,394

(22) Filed: Jul. 24, 2025

Related U.S. Application Data

(60) Provisional application No. 63/675,455, filed on Jul. 25, 2024.

(51) Int. Cl.
*B60G 3/14* (2006.01)
*B60G 15/08* (2006.01)

(52) U.S. Cl.
CPC .............. *B60G 3/14* (2013.01); *B60G 15/08* (2013.01); *B60G 2200/31* (2013.01); *B60G 2202/152* (2013.01); *B60G 2206/10* (2013.01); *B60G 2206/31* (2013.01)

(58) Field of Classification Search
CPC ...... B60G 3/14; B60G 15/08; B60G 2200/31; B60G 2202/152; B60G 2206/10; B60G 2206/31
See application file for complete search history.

(56) References Cited

U.S. PATENT DOCUMENTS

| | | | | |
|---|---|---|---|---|
| 3,494,609 A | * | 2/1970 | Harbers, Jr. ......... | B60G 11/465 280/124.17 |
| 3,630,541 A | * | 12/1971 | Carlson .................. | B60G 11/27 267/52 |
| 3,674,249 A | * | 7/1972 | McGee ................ | B62D 61/125 267/52 |
| 3,960,388 A | * | 6/1976 | Strader .................. | B60G 9/003 280/86.757 |
| 4,162,090 A | * | 7/1979 | Schwartz .............. | B60G 11/113 267/52 |
| 4,261,597 A | * | 4/1981 | Vandenberg ........... | B62D 17/00 280/86.75 |

(Continued)

FOREIGN PATENT DOCUMENTS

GB        1069789 A  *  5/1967  ........... B60G 17/033

*Primary Examiner* — Jason D Shanske
*Assistant Examiner* — Shams Dhanani
(74) *Attorney, Agent, or Firm* — Jonathan A. Bay

(57) ABSTRACT

A pneumatic trailing beam suspension invention has an axle provided with a left and right welded-on landing pads. Each landing pad has a spaced pair of upper semi-circular axle-seat races that cup about a quarter of the axle's sidewall, terminate in a lower box foot. The left and trailing arm-beams are formed with recessed seat pockets for the landing pads' box feet to nest/dock/land in. The axle is otherwise clamped to the left and trailing arm-beams by U-bolts, or straight bolts and a mounting cap. The land pads and seat pockets cooperate to resist axle twisting by brake torque loading. There is additionally an upright fixed down pin extending upright from the center of the recessed seat pocket, and a cooperating dowel hole in the foot of the landing pad which also cooperate to resist axle twisting by brake torque loading.

20 Claims, 11 Drawing Sheets

(56)                    References Cited

U.S. PATENT DOCUMENTS

| | | | | |
|---|---|---|---|---|
| 5,201,898 | A * | 4/1993 | Pierce | B62D 17/00 |
| | | | | 403/4 |
| 6,131,930 | A * | 10/2000 | Chalin | B60G 9/02 |
| | | | | 280/86.75 |
| 8,919,793 | B1 * | 12/2014 | Klein | B60G 7/008 |
| | | | | 280/124.116 |
| 9,505,284 | B1 | 11/2016 | Klein et al. | B60G 9/02 |
| 10,011,153 | B1 * | 7/2018 | Klein | B62D 53/068 |
| 10,370,033 | B1 * | 8/2019 | Klein | B62D 21/20 |
| 10,807,428 | B1 * | 10/2020 | Klein | B60G 5/047 |
| 11,597,246 | B1 * | 3/2023 | Klein | B60G 11/465 |
| 11,712,938 | B1 * | 8/2023 | Klein | B62D 7/144 |
| | | | | 280/86.5 |
| 11,794,545 | B1 * | 10/2023 | Klein | B60G 11/27 |
| 12,227,046 | B1 * | 2/2025 | VanDenberg | B62D 61/12 |
| 2005/0057014 | A1 * | 3/2005 | Ramsey | B60G 7/001 |
| | | | | 280/124.116 |
| 2006/0273540 | A1 * | 12/2006 | Heron | B60G 5/02 |
| | | | | 280/124.1 |
| 2012/0126504 | A1 * | 5/2012 | Piehl | B60G 11/27 |
| | | | | 280/124.116 |
| 2014/0197613 | A1 * | 7/2014 | Aalderink | B60G 7/008 |
| | | | | 280/124.116 |
| 2018/0370565 | A1 * | 12/2018 | White | B60B 35/025 |

* cited by examiner

PNEUMATIC TRAILING BEAM SUSPENSION WITH A BOLTED AXLE CONNECTION, THUS WITHOUT WELDING THE AXLE TO THE TRAILING ARM-BEAMS

CROSS-REFERENCE TO PROVISIONAL APPLICATION(S)

This application claims the benefit of U.S. Provisional Application No. 63/675,455, filed Jul. 25, 2024. The foregoing patent disclosure is incorporated herein by this reference thereto.

BACKGROUND AND SUMMARY OF THE INVENTION

The invention relates to heavy duty vehicle suspensions for cargo trailers of cargo transportation vehicles and, more particularly, to a pneumatic trailing beam suspension with a bolted axle connection, thus obviating welds between the axle and trailing arm-beams.

The axles on the trailers are typically suspended with leaf spring suspensions. However, for better performance, pneumatic (air ride) suspensions are preferred. Indeed while pneumatic suspensions do give better performance, pneumatic suspensions are adversely typically more expensive and more complicated systems for the trailer OEM to set up.

As an aside, and for most readers needless to say, the acronym "OEM" stands for 'original equipment manufacturer.' More importantly, and a distinction which might be overlooked by most at first, the trailer OEM is distinct from the suspension OEM.

Applicant here is a suspension OEM, and is the only suspension OEM mentioned in this document. Applicant has a variety of customers, and they are trailer OEM's for the most part, with a variety of different needs and a variety of different capabilities of assembling applicant's suspensions to their trailers (or other land vehicles). (And these trailer OEM's have other customer, like freight haulers and so on.)

So again, a trailer OEM might have limited capabilities when it comes to assembling any of applicant's suspensions to the trailer OEM's trailer(s) (or other vehicles).

For example, tasking a trailer OEM to weld a trailing beam suspension's pair of fabricated trailing arm-beams squarely to a heavy wall axle is a more complicated operation than that of leaf spring installation. This requires special fixturing and setup that some trailer OEMs are not equipped to do, but which applicant (the suspension OEM hereof), is readily equipped to do.

It is common practice for a trailer manufacture (OEM) to be able to set up a leaf spring suspension with a U-bolted axle connection as an example arrangement to mount to their trailer frame. Typically, the mount is to a box frame undercarriage of the like, or else to a sliding subframe that slidable among multiple fixed positions under the box frame undercarriage. For leaf spring axles, the axles are typically delivered to the trailer OEM with leaf spring seats welded to the axles per the trailer OEM spacing specifications of the trailer OEM's spring centers. This makes it easy for the trailer OEM to mount the leaf springs to the axle, and clamp down to the leaf spring seat on the axle with U-bolts that are torqued to specification.

There are current pneumatic (air ride) suspensions in the market where the left and right trailing arm-beams are welded to the axle. And if the axle requires welding, then such an axle needs to have a thicker side-wall thickness, than those axles that are suspended with leaf springs wherein their axle connection arrangement is via clamping U-bolts.

This being the case for axles requiring thicker tubular walls (than thinner tubular walls), those thicker tubular-wall axles are not as readily available, weigh more, and cost more than thinner-walled, leaf-spring suspension axles.

As mentioned previously, the requirement for the trailer OEM to weld a pair of fabricated trailing arm-beams squarely to a heavy walled axle (thick walled axle) is a more complicated operation than that of leaf spring installation. This requires special fixturing and setup that some trailer OEMs (in contrast to applicant, a suspension OEM) are not equipped to do.

A number of additional features and objects will be apparent in connection with the following discussion of the preferred embodiments and examples with reference to the drawings.

Before that, though, the following comprises a non-exhaustive list of U.S. patents previously procured by applicant.

1. U.S. Pat. No. 8,919,793 B1, Klein et al., "LATERAL-STABILITY PROMOTING SEMI-TRAILER SUSPENSION," Patented Dec. 30, 2014.
2. U.S. Pat. No. 9,505,284 B1, Klein et al., "LATERAL-STABILITY PROMOTING SEMI-TRAILER SUSPENSION," Patented Nov. 29, 2016.
3. U.S. Pat. No. 10,011,153 B1, Klein, "SUSPENSION FOR VANS OR SEMI-TRAILERS MOUNTED UNDER A SLIDING FRAME, WHICH FRAME HAS BOLTED-IN CROSS MEMBERS, INDEPENDENT AIR SPRING TOWERS, AND OIL-FREE SHOCKS," Patented Jul. 3, 2018.
4. U.S. Pat. No. 10,370,033 B1, Klein, "SLIDING SUB-FRAME FOR HEAVY-DUTY VEHICLE SUSPEN-SION, INCLUDING TORQUE BOX, AIR SLIDER PIN, AND SHEAR-OFF NUT," Patented Aug. 6, 2019.
5. U.S. Pat. No. 10,807,428 B1, Klein et al., "LEAF-SPRING SUSPENSION SYSTEMS WITH COMPLI-ANT OVERSIZED PIVOT BUSHINGS," Patented Oct. 20, 2020.
6. U.S. Pat. No. 11,597,246 B1, Klein et al., "MECHANI-CAL SLIDER SUSPENSION OPTIMIZED WITH AIR RIDE," Patented Mar. 7, 2023.
7. U.S. Pat. No. 11,712,938 B1, Klein et al., "PISTON-LESS PNEUMATIC DAMPENING AND STRAIGHT CENTERING FOR A STEERABLE AXLE OF A HEAVY-DUTY VEHICLE," Patented Aug. 1, 2023.
8. U.S. Pat. No. 11,794,545 B1, Klein et al., "LIFT AXLE SUSPENSION SYSTEM FOR A HEAVY DUTY VEHICLE, WHICH SUSPENSION SYSTEM USES X-ROD CONTROL ARMS FOR IMPROVED LAT-ERAL STABILITY," Patented Oct. 24, 2023.

The foregoing are incorporated herein by this reference thereto, for all purposes, and as if fully set forth next.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings.

Figure 1:
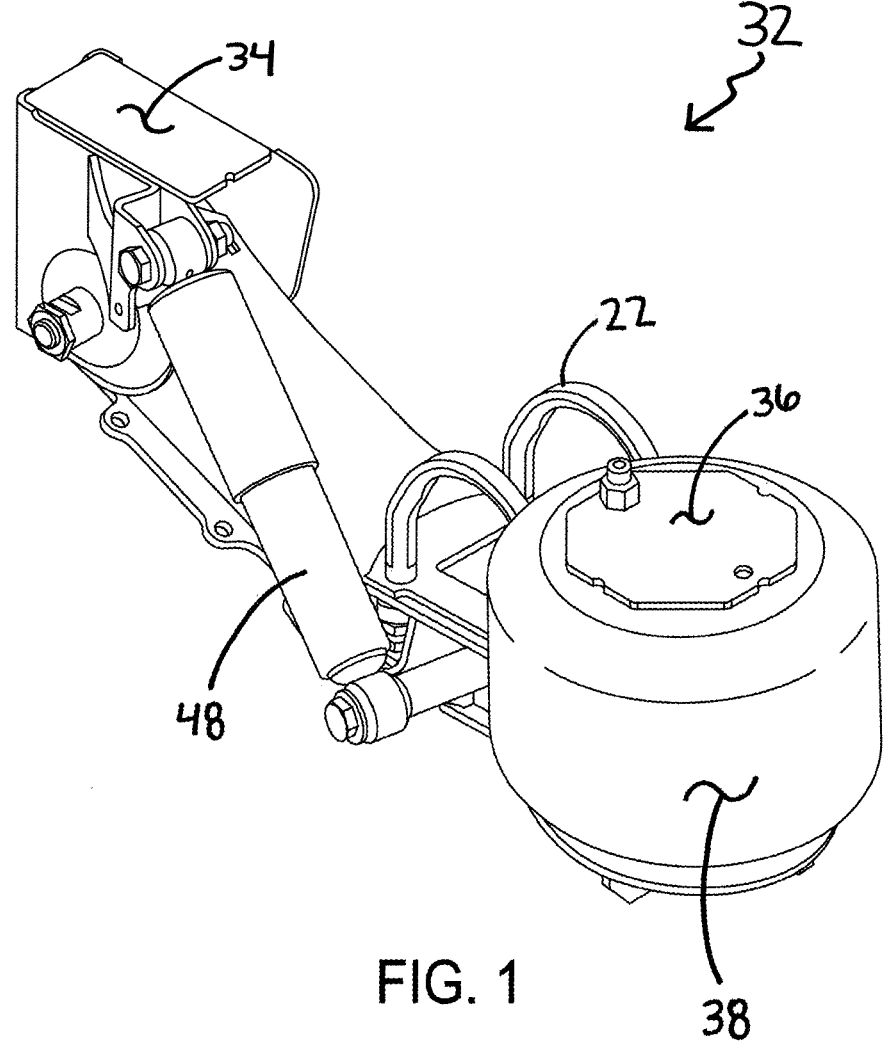
FIG. 1 is a perspective view of a pneumatic trailing beam suspension in accordance with the invention having a bolted 'axle connection' (any of U-bolts, straight bolts and so on)
Figure 2:
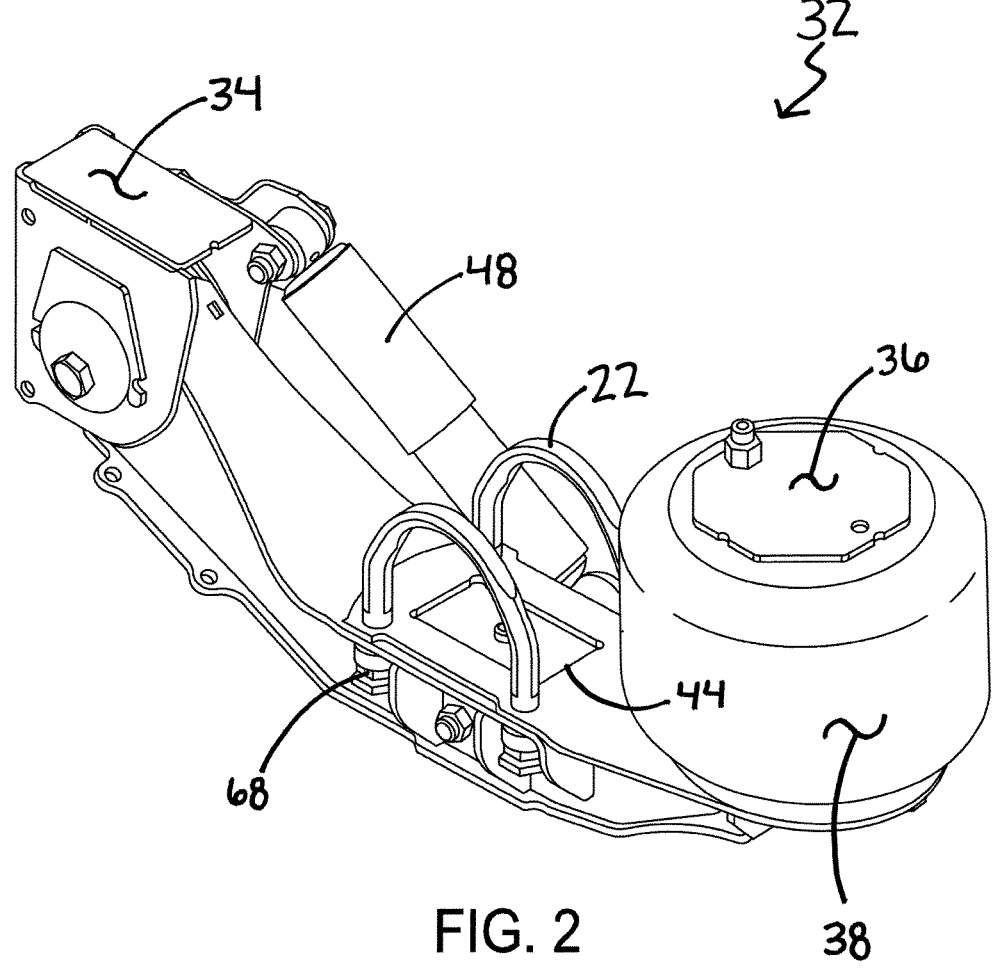
Figure 3:
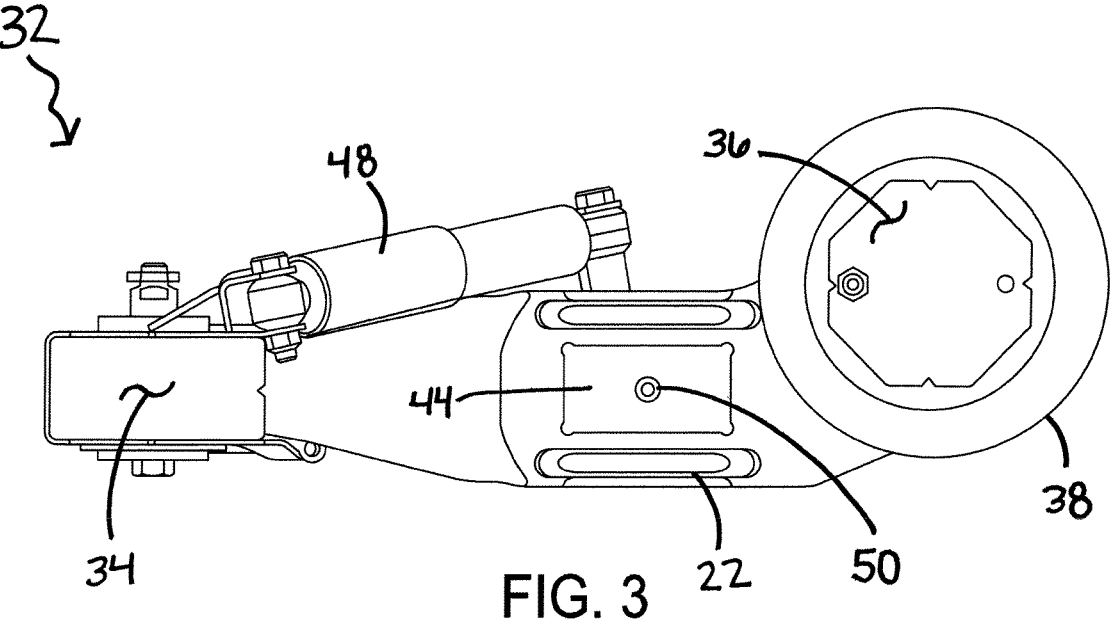
Figure 4:
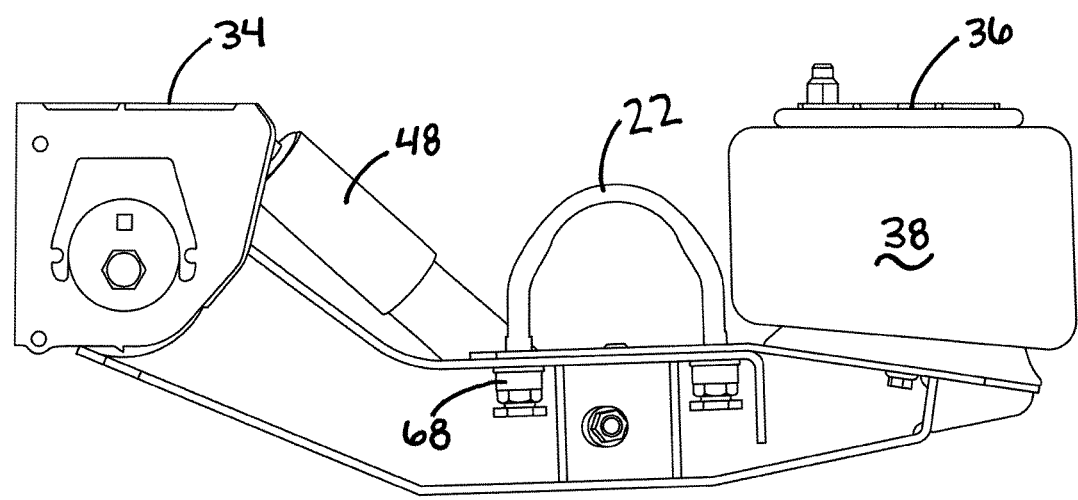
Figure 5:
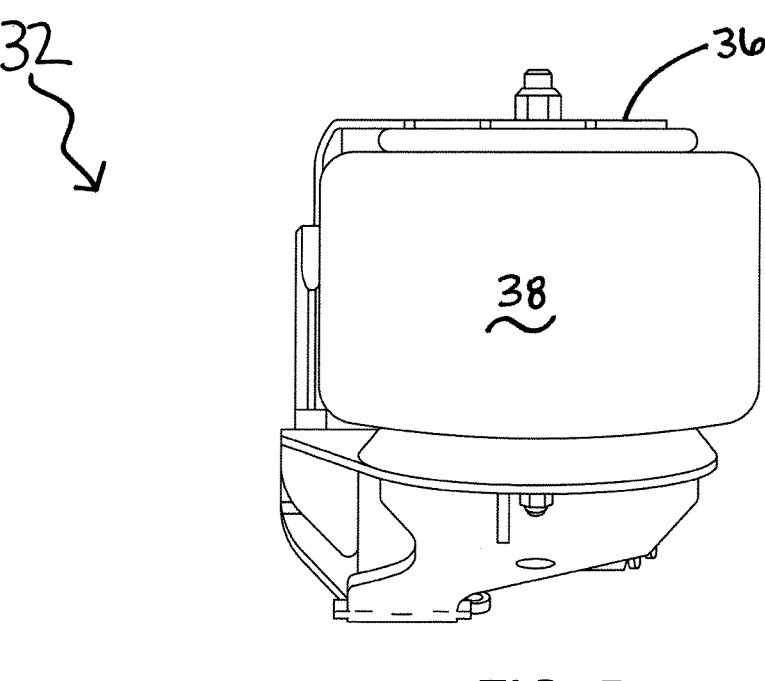
Figure 6:
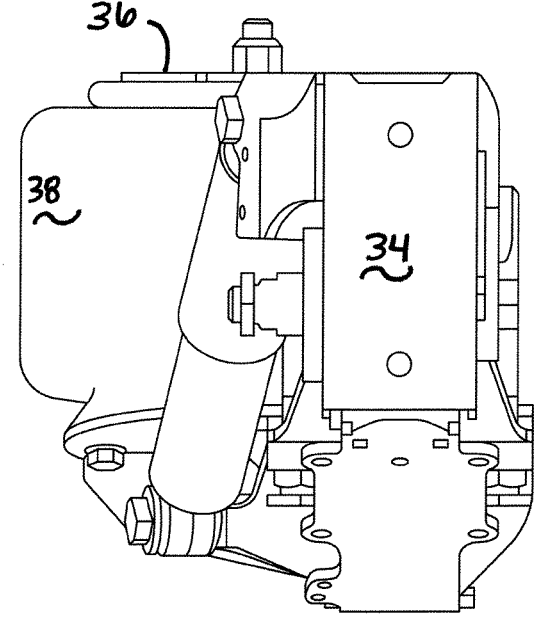
Figure 7:
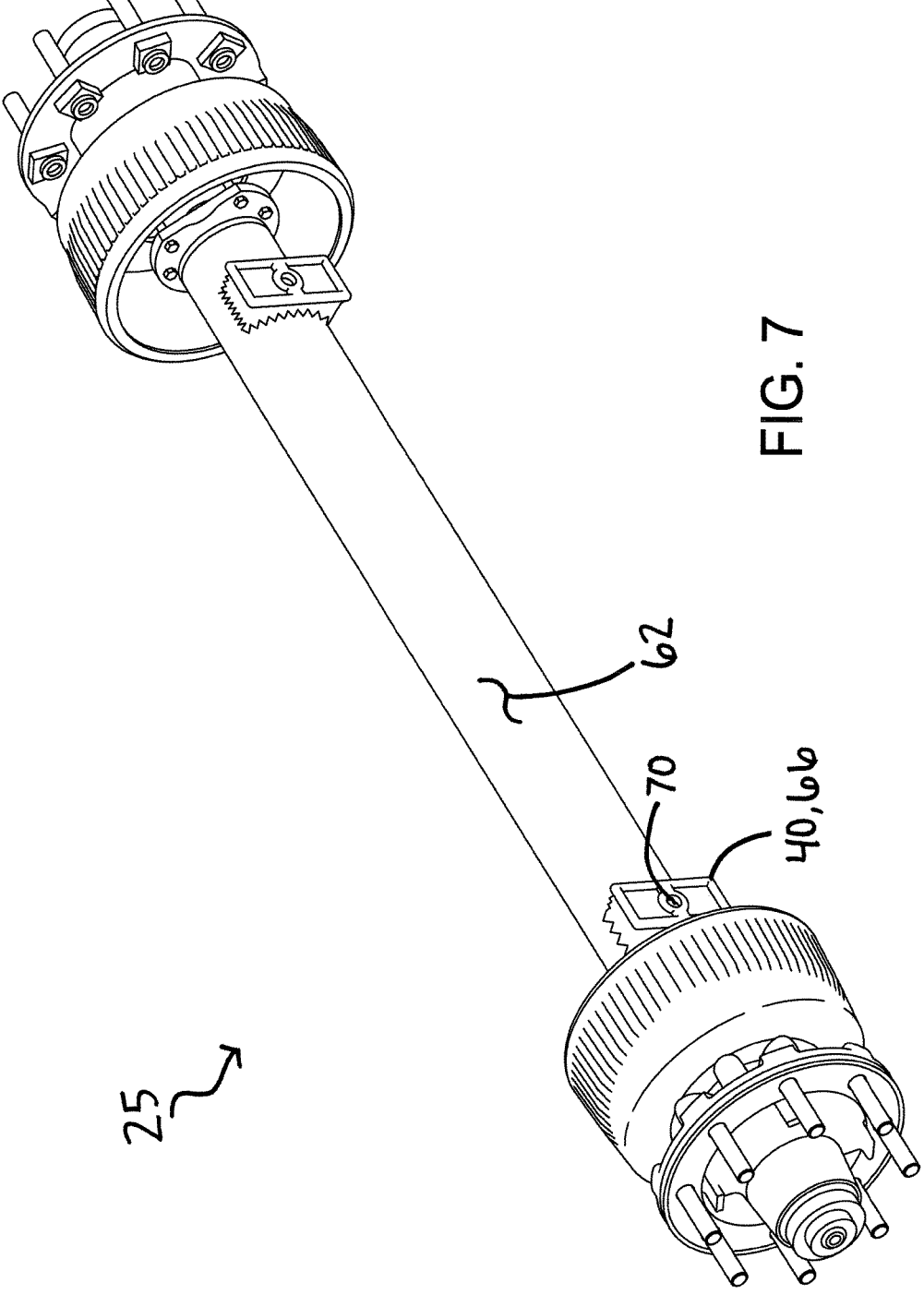
Figure 8:
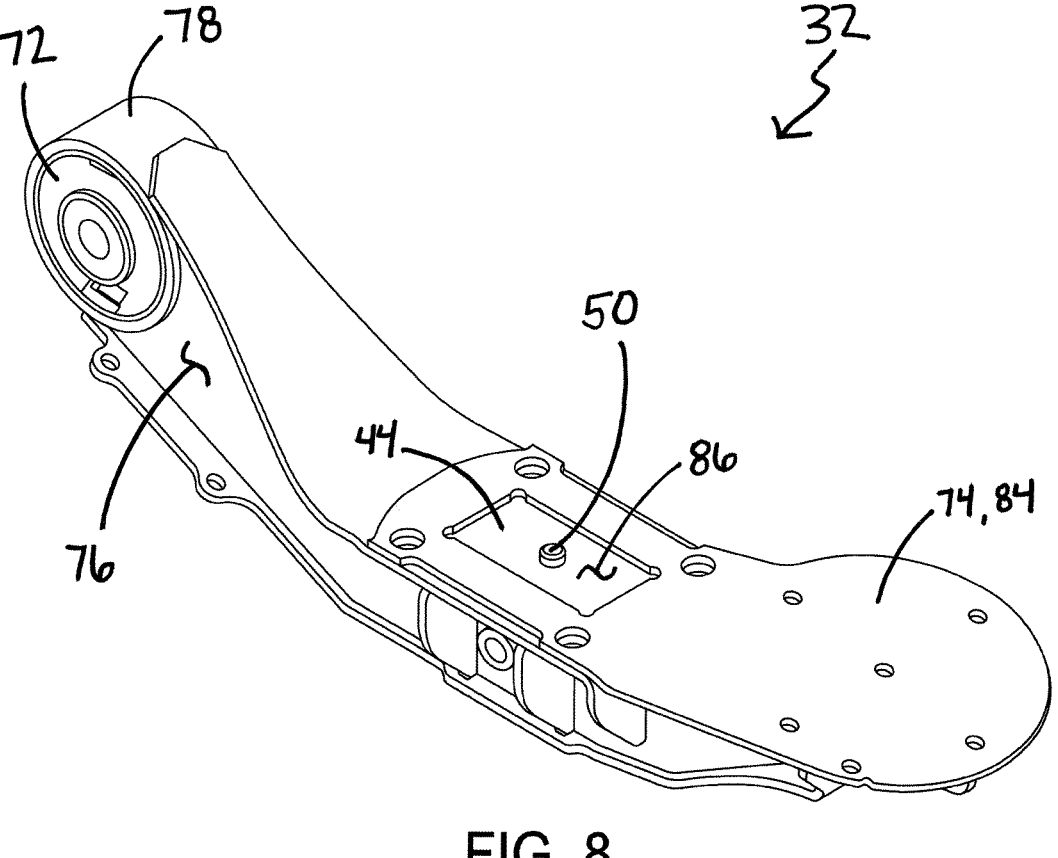
Figure 9:
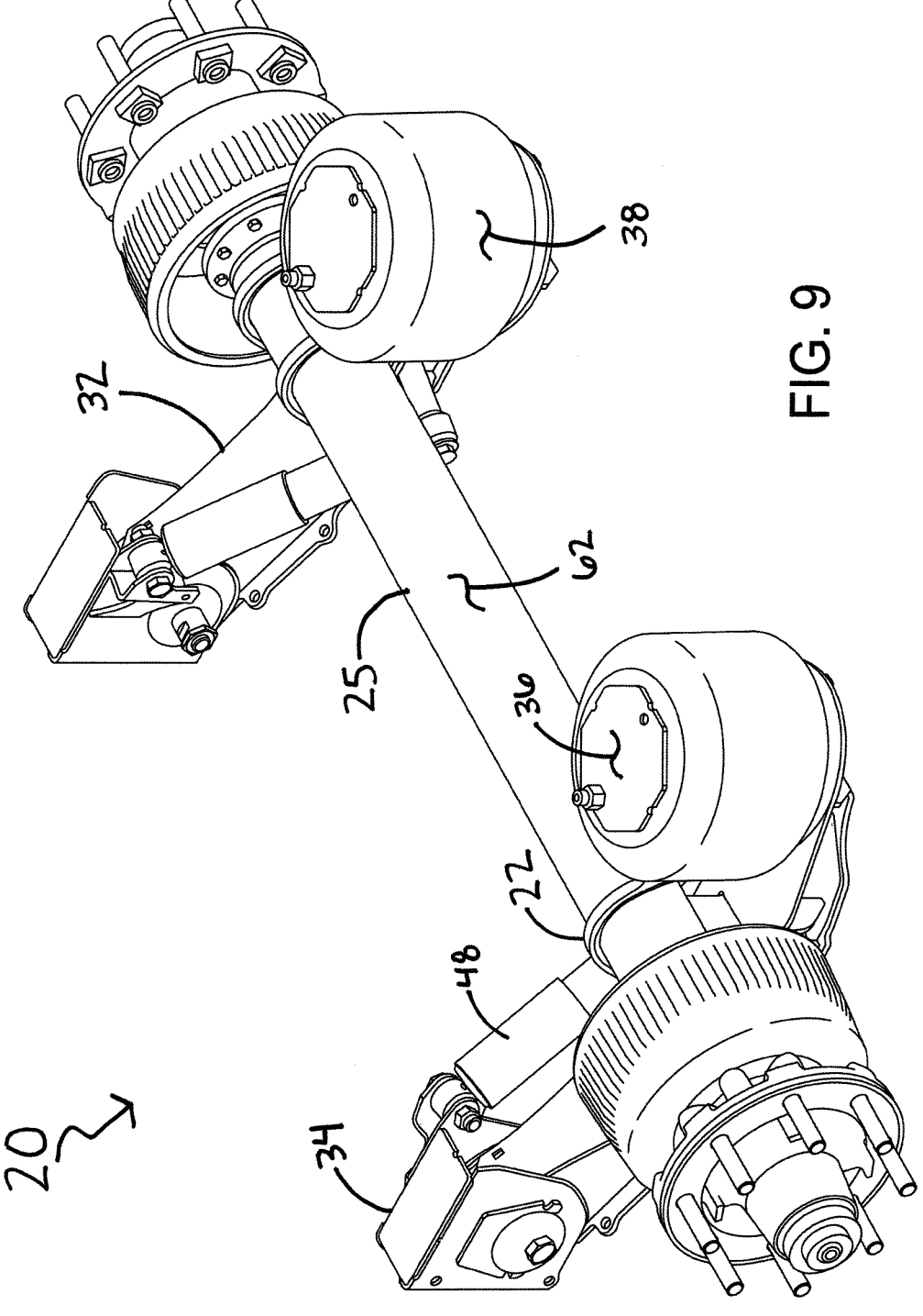
Figure 10:
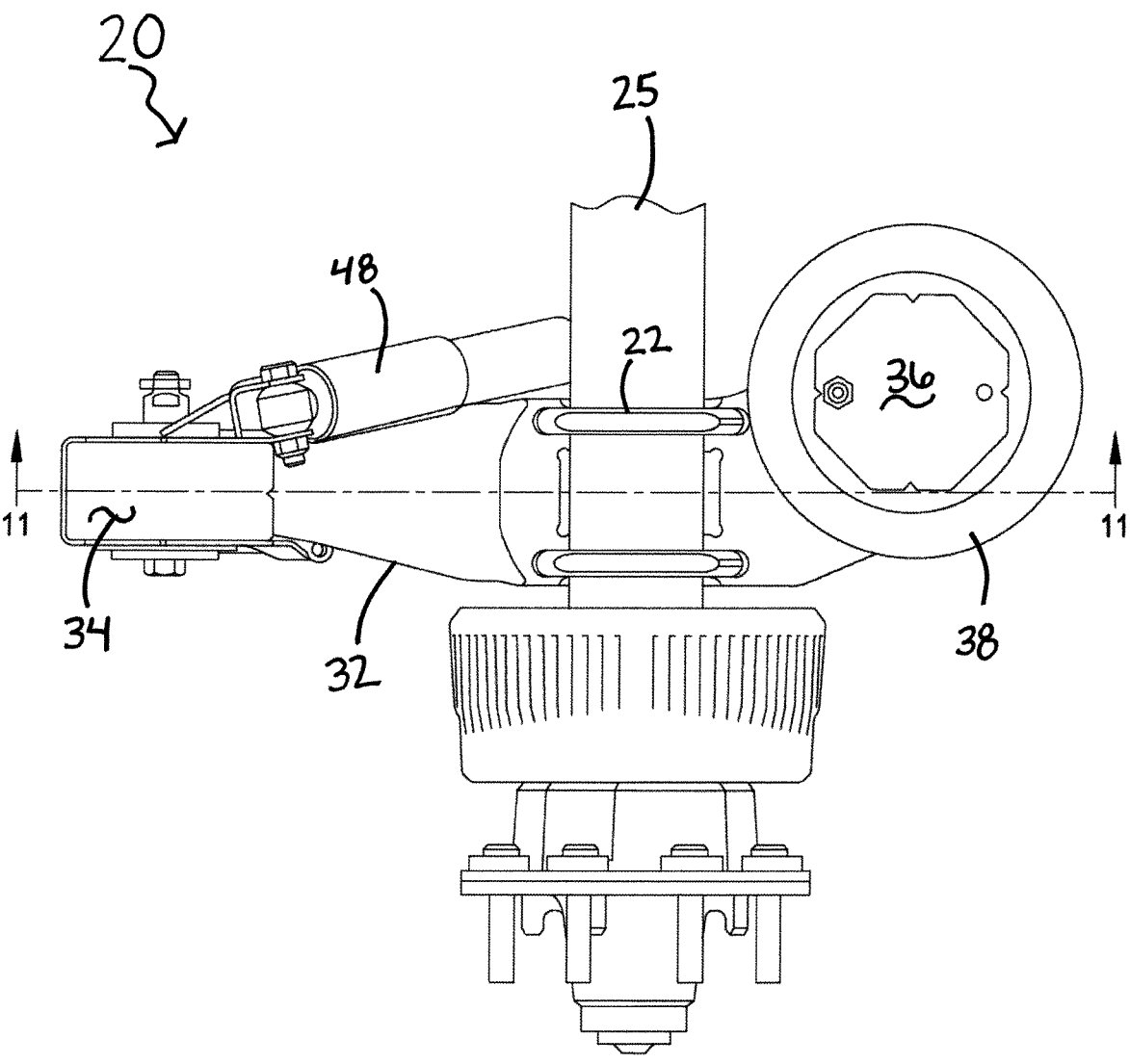
Figure 11:
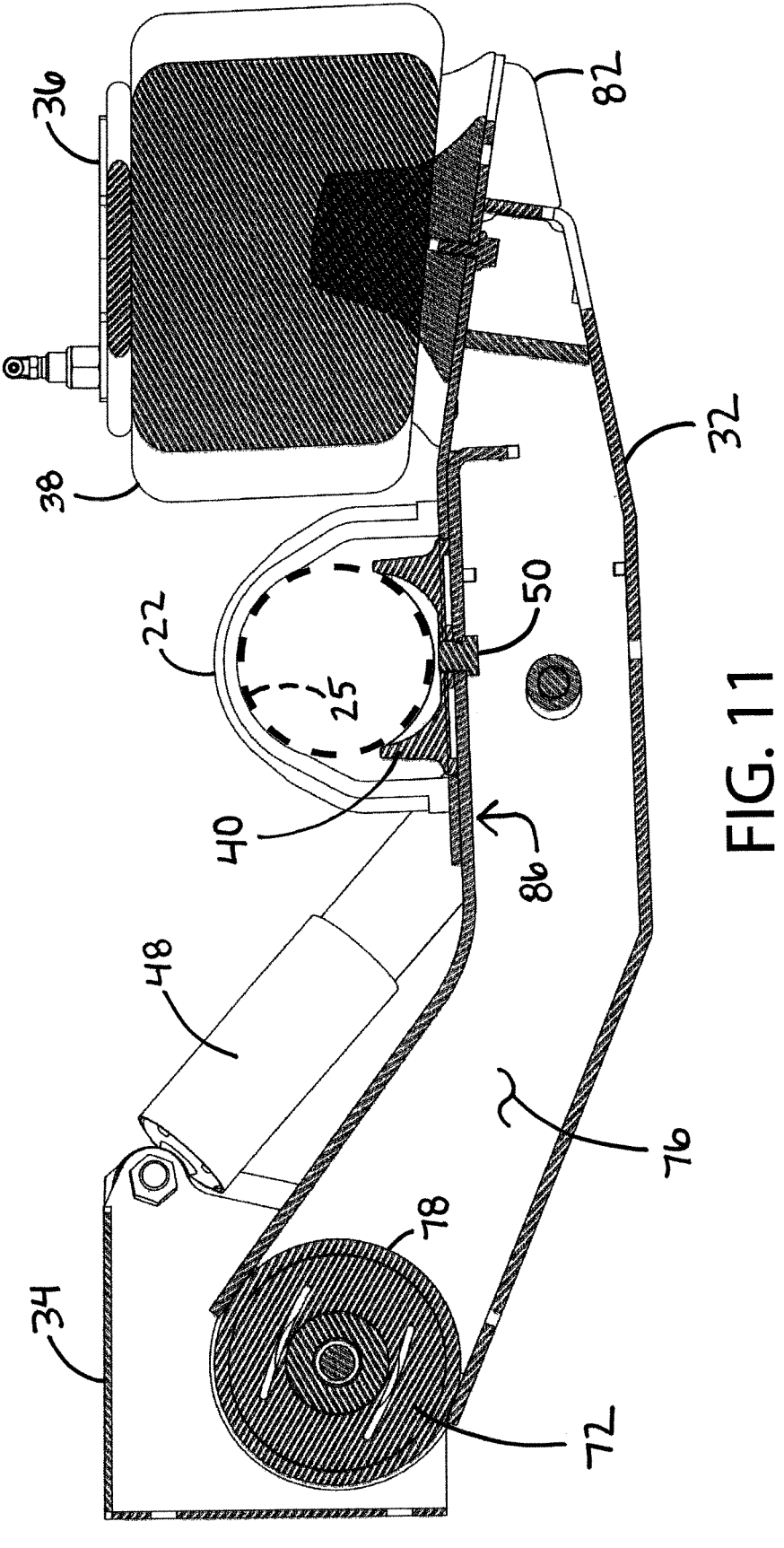
Figure 12:
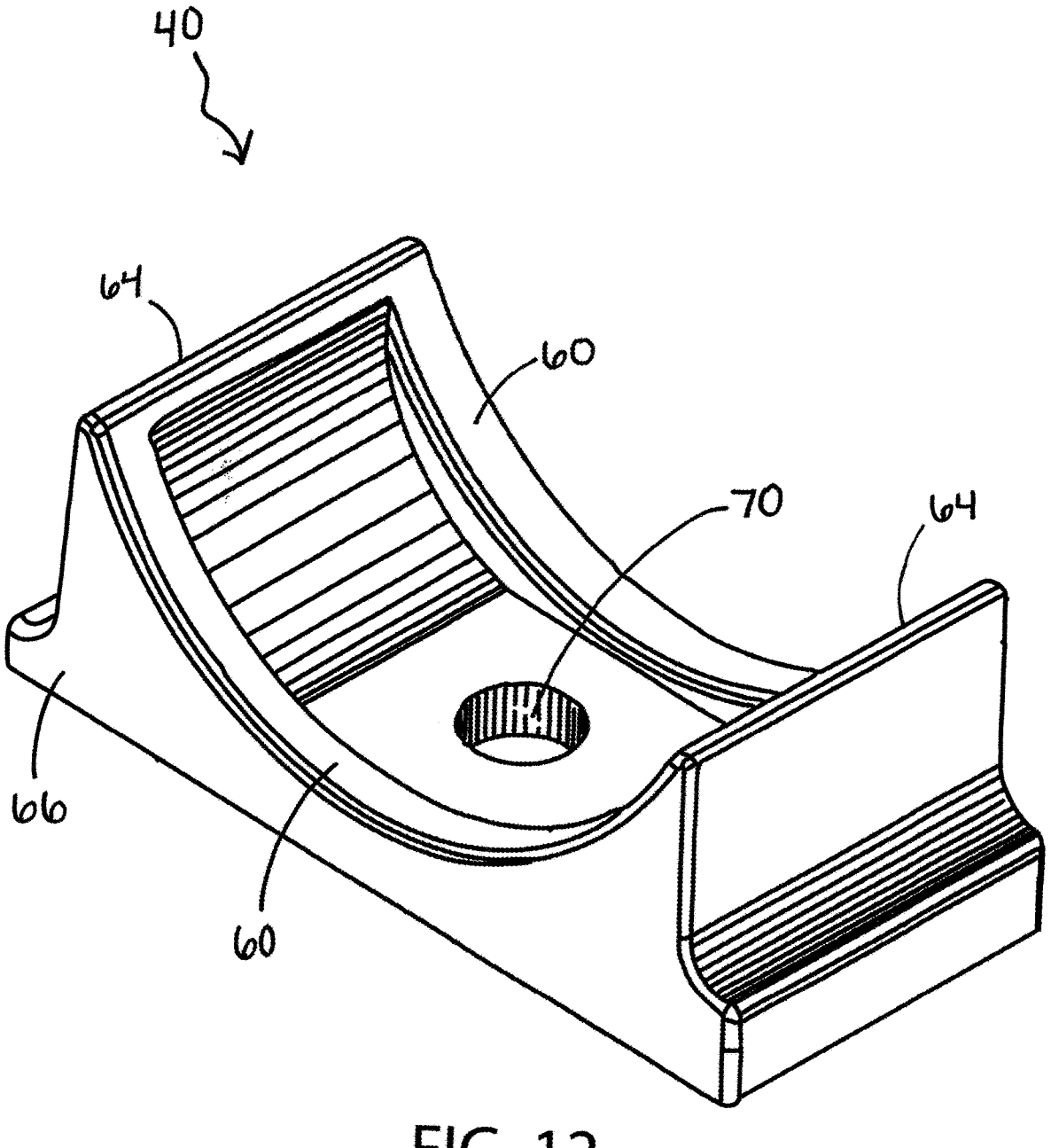
Figure 13:
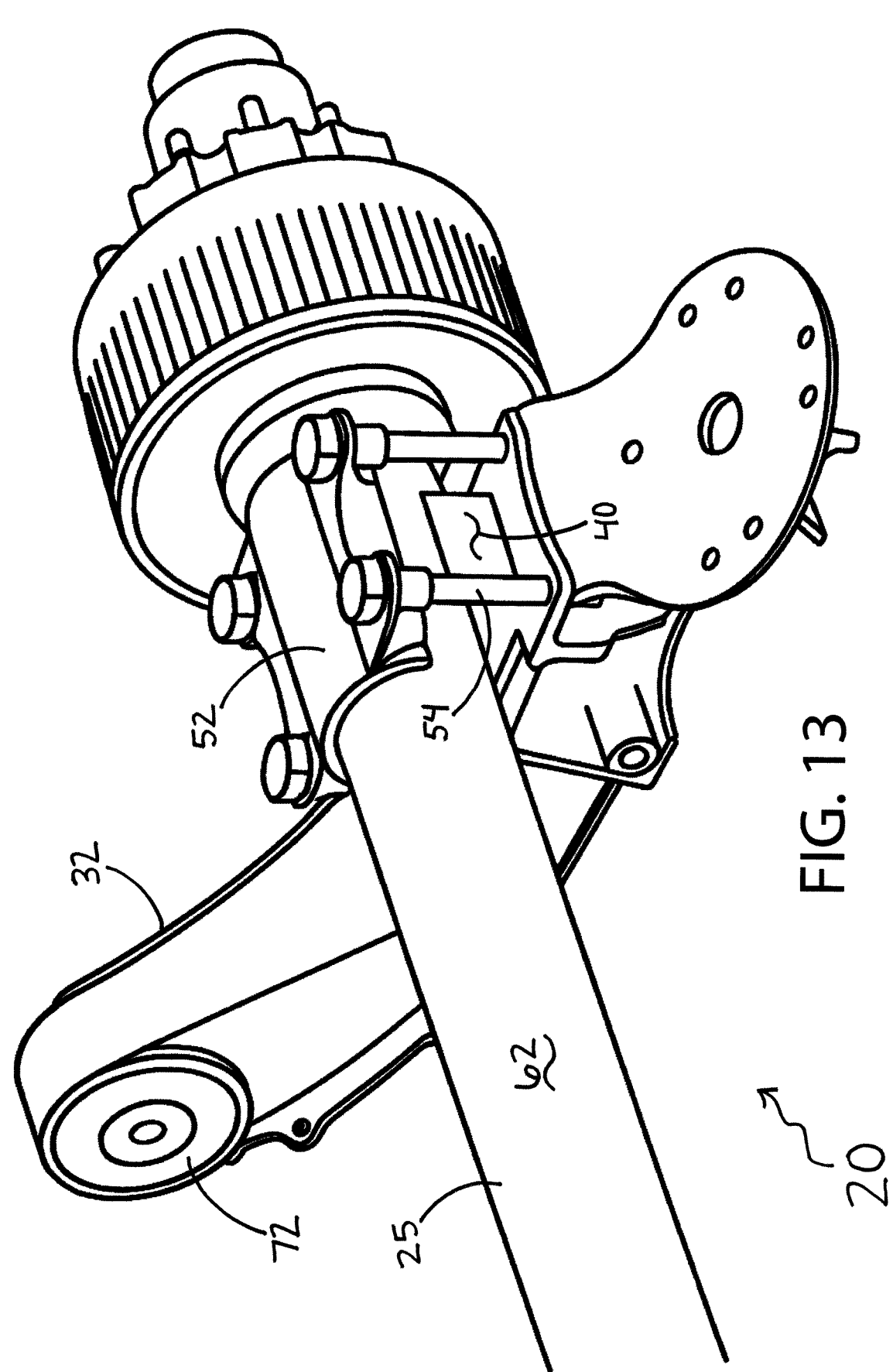

(axle not shown, but see FIGS. 7, 9-11 and 13), thereby obviating any welding between the axle and the left and right the trailing arm-beams, wherein the hanger (in the upper left of the view) represents the leading end of the trailing arm-beam, and, this trailing arm-beam would be disposed on the right side (starboard side) of the suspension;

FIG. 2 is perspective view comparable to FIG. 1 except for the trailing arm-beam disposed on the left side (driver side, or port side) of the suspension;

FIG. 3 is a top plan view of FIG. 2;

FIG. 4 is an outboard side elevation view of FIG. 3;

FIG. 5 is a rear elevational view of FIG. 4;

FIG. 6 is a front elevational view of FIG. 4;

FIG. 7 is a reduced-scale perspective view of an axle equipped with left and right, spaced landing pads in accordance with the invention, welded onto the axle, for nesting/docking/landing in seat pocket receptacles therefor, one apiece formed in each of the respective left and right trailing arm-beams;

FIG. 8 is a perspective view of the trailing arm-beam in FIG. 2 in isolation, with the hanger, air spring, shock absorber and U-bolts removed from view to better show seat pocket for receiving the axle's welded-on landing pad (neither an axle nor a landing pad are shown in FIG. 8, but see FIG. 7), wherein the seat pocket is recessed into an upper surface of the trailing arm-beam, as well as has a locator dowel pin extending upright from the center of geometry of the seat pocket;

FIG. 9 is a perspective view of the assembled pneumatic trail beam suspension in accordance with the invention, comprising the assembly of FIGS. 1 and 2 with the axle of FIG. 7;

FIG. 10 is an enlarged-scale top plan view of the left side (driver side, or port side) of FIG. 9;

FIG. 11 is a cross-sectional view taken along line XI-XI in FIG. 10;

FIG. 12 is an enlarged-scale perspective view of one landing pad in isolation, for welding onto the axle at spaced left and right locations, and for nesting/docking/landing in the respective seat pocket of either the left or right trailing arm-beam; and FIG. 13 is a perspective view comparable to FIG. 2 except substituting the U-bolts with a mounting cap along with a foursome of straight bolts: eg., four ⅞-ths inch nominal diameter, 14 UNF thread, by seven (7) inches long Grade 8 bolts (or cap screws).

DETAILED DESCRIPTION OF THE PREFERRED EMBODIMENTS

FIG. 9 shows a pneumatic trailing beam suspension 20 in accordance with the invention having a bolted 'axle connection' (executed with U-bolts 22 as shown here), thereby obviating any welding between the axle 25 and the left and right trailing arm-beams 32. The hangers 34 (both in the upper left of the view) represent the leading ends of the trailing arm-beams 32. The hangers 34 and the top plate 36 of the pneumatic air bellows 38 would be affixed to the underside of a box frame undercarriage of a trailer of vehicle (not shown) or alternatively to a sliding subframe that is slidable among multiple fixed positions under the box frame undercarriage, according to freight loading.

FIG. 1 shows the right side (starboard side) trailing arm-beam 32 in isolation, FIG. 2 the left side (driver side, or port side). FIGS. 3-6 are top, outboard side, rear and front views of FIG. 2.

FIG. 7 shows an axle 25 equipped with left and right, spaced landing pads 40 in accordance with the invention, welded onto the axle 25, for nesting/docking/landing in seat pocket receptacles 44 therefor, one apiece formed in each of the respective left and right trailing arm-beams 32.

FIG. 8 shows the trailing arm-beam 32 in FIG. 2 in isolation, with the hanger 34, air spring 38, shock absorber 48 and U-bolts 22 removed from view to better show seat pocket 44 for receiving the axle 25's welded-on landing pad 40 (neither an axle 25 nor a landing pad 40 are shown in FIG. 8, but see FIG. 7). Wherein the seat pocket 44 is recessed into an upper surface of the trailing arm-beam 32, as well as has a locator dowel pin 50 extending upright from the center of geometry of the seat pocket 44.

FIG. 10 is a top plan view of the left side (driver side etc.) of FIG. 9.

FIG. 11 is a cross-sectional view taken along line XI-XI in FIG. 10.

FIG. 12 is an enlarged-scale perspective view of one landing pad 40 in isolation.

FIG. 13 is comparable to FIG. 2 except substituting the U-bolts 22 with a mounting cap 52 along with a foursome of straight bolts 54:—eg., four ⅞-ths inch, 14 UNF×7 inches long Grade 8 bolts (or cap screws).

In order to eliminate a welded connection between the trailing arm-beams 32 and the axle 25, applicant sought to solve the brake torque issue.

Applicant starts this endeavor by utilizing a standard leaf-spring axle 25. To turn to FIG. 12, applicant then makes (eg., fabricates from a casting, or by machining and/or by machining a casting, or produces by other fabrication processes) a landing pad 40. That is, applicant produces a landing pad 40 (as shown in FIG. 12) that has transversely-spaced semi-cylindrical races 60 serving as axle seats (60). A cylindrical axle 25 is set in both of the semi-cylindrical-races 60 (or, axle seats 60) of both a left and right landing pad 40 (which can be surmised from the views including FIG. 7). The races 60 cup about the bottom quarter of the axle 25 sidewall 62. The landing pads 40 are welded to the axle 25 as shown. For each landing pad 40, the axle 25 welded to both the inboard cylindrical-race axle seat 60 and the outboard cylindrical-race axle seat 60 of the same one single landing pad 40 (eg., FIG. 12), as well as the transverse upper edges 64.

To turn to FIG. 8, each trailing arm-beam 32 has a rectangular seat pocket 44 formed/recessed in its upper surface. The respective landing pad 40 has a box foot 66 defining a rectangular footprint. The box foot 66 nests/docks/lands inside that rectangular, recessed seat pocket 44. The axle 25 is then bolted to the trailing arm-beam 32 by U-bolts 22 (eg., FIGS. 9-11) or a mounting cap 52 along with a foursome of straight bolts 54:—eg., ⅞-ths inch diameter, 14 UNF thread and seven (7) inches long Grade 8 bolts (or cap screws)(see eg., FIG. 13) and shear-off nuts 68.

Shear-off nuts 68 are shown in U.S. Pat. No. 10,370,033 B1, Klein, "SLIDING SUB-FRAME FOR HEAVY-DUTY VEHICLE SUSPENSION, INCLUDING TORQUE BOX, AIR SLIDER PIN, AND SHEAR-OFF NUT," Patented Aug. 6, 2019, referenced above incorporated herein by reference thereto.

As mentioned, the landing pad 40 has a box foot 66 with a rectangular footprint. For 16,000 lb.-capacity axles, this landing pad 40 is three (3) inches wide with a bottom center dowel hole 70 (see eg., FIG. 12) for receiving a dowel pin 50 that is centered in the respective trailing arm-beam 32's rectangular seat pocket 44 (see eg., FIG. 8). Otherwise, for 10,000 to 12,000 lb.-capacity axles, the landing pad 40 is two-and-one half (2½) inches wide, also with a bottom center dowel hole 70 for receiving the dowel pin 50 of the seat pocket 44 of the respective trailing arm-beam 32.

To make the pneumatic trailing beam suspension 20's left and right trailing arm-beams 32 accommodate the leaf-spring axle 25, the trailing arm-beams 32 are formed with the rectangular seat pocket 44 for the landing pad 40 to nest/dock/land in, and thereby obviate any welding between the trailing arm-beams 32 and the axle 25. The "axle connection," once the landing pads 40 have been affixed to the axle 25 by the suspension OEM (eg., applicant) to the leaf-spring axle 25 on centers according to the trailer OEM's specification (applicant's customer), the axle 25 only needs to be fastened by a pair of U-bolts 22, or in an alternative, by a mounting cap 52 along with a foursome of straight bolts 54:—eg., ⅞-ths inch nominal diameter, 14 UNF thread by seven (7) inches long Grade 8 bolts (or cap screws).

By these arrangements, the trailing arm-beams 32 capture the axle 25 by the provisions of the landing pads 40 nested in the recessed seat pocket 44. And with the trailing arm-beams 32 also being bolted to the axle 25, the nesting of the landing pads 40 in the recessed seat pockets 44 thus support the axle 25 to resist twisting by brake torque loading. Moreover, each of the trailing arm-beams 32 accommodates a pivot bushing 72 at the leading end for bolting to a hanger 34 hung on the underside of some frame of the trailer (not shown), and also have and accommodate an air-spring seat 74 and an air spring 38 on the trailing end, as well as a shock absorber 48 (or other limiter for over-extension or over-compression of the air spring 38).

It is an aspect of the invention to provide a fabricated or cast metal pneumatic (air ride) suspension 20 in a trailing beam configuration that has a bolted axle-clamping arrangement to restrain the axle 25 with respect to the left and right trailing arm-beams 32. The dowel pin 50 extending upright from the seat pocket 44 of the trailing arm-beam 32 inserts into the locating hole 70 in the landing pad 40 welded to axle 25. The insertion of the dowel pin 50 into the locating hole 70 (aperture) therefor helps maintain the axle 25 in position, not only for initial assembly but also for restraint of brake torque loading in combination with the clamping of the bolts around the axle 25.

In addition to the dowel pin 50, the trailing beam suspension 20 configuration has a trailing arm-beam 32 that has a seat pocket 44 for the landing pad 40 welded to the axle 25 that is a receptacle (eg., a picture frame opening) that receives the box foot 66 of the landing pad 40. The nesting/docking/landing of the box foot 66 of the landing pad 40 in this recessed receptacle (eg., open picture frame) is the seat pocket 44 that holds the landing pad 40 tight in respect of fore to aft displacement relative to the respective trailing arm-beam 32.

That is, each trailing arm-beam 32 is a composite structure comprising a fabricated (or cast) generally I-beam portion 76 extending from a leading eye-formed end 78 (which carries an oversized pivot bushing 72 for bolting to the hanger 34 affixed to the box frame undercarriage of the trailer) to a trailing end 82. The trailing end 82 of the I-beam portion 76 has laid over the top thereof a plate portion 84 of the trailing arm-beam 32's composite structure. The plate portion 84 has a fore portion that is cut-out to form the rectangular seat pocket 44. The seat pocket 44 as a whole is recessed and has a bottom wall (86) that is actually the top surface of the upper wall 86 of the I-beam portion 76 of the trailing arm-beam 32. The dowel pin 50 is a large-headed smooth pin that is inverted and inserted through a hole in the I-beam portion 76's upper wall 86 on the center of geometry of the seat pocket 44. The dowel pin 50 is then welded in place along the bottom surface of the upper wall 86 of the I-beam portion 76.

The seat pocket 44 'captures' the box foot 66 of the landing pad 40, which promotes maintaining the axle 25 in position if a large G-force jolt is input to the trailing beam suspension 20.

The bolted clamping arrangement can be accomplished with standard U-bolts 22 (rather than specialized U-bolts 22). But preferably the bolted clamping arrangement of the above is accomplished with outwardly tapered U-bolts 22 that are wider at the base to have more moment resistance to brake torque from the trailing arm-beam 32, with the landing pad 40 bearing against the seat pocket 44 of the trailing arm-beam 32. Alternatively, the bolted clamping arrangement of the above can be accomplished with straight bolts 54 and an axle mounting cap 52.

The bolted clamping arrangement of the above is accomplished with torque control nuts 68 (eg., shear-off nuts 68 as referenced above in connection with another of applicant's patents) to promote the quality (integrity) of the clamping arrangement.

The mentioned trailing beam suspension 20 can be used with an axle lifting arrangement to pick the axle 25 and tires off the ground when the trailer (vehicle) is light or unloaded (not shown).

The trailing beam suspension 20 can also be used on a slidable subframe configuration of the trailer (vehicle) frame that can be fixed, or positioned/movable under the box frame undercarriage of the trailer to another fixed position, to adjust axle loading.

The trailing beam suspension 20 can be galvanized-coated for better rust prevention since the trailing arm-beams 32 are bolted and not welded to the axle 25 during assembly.

The spring force for the trailing beam suspension 20 in accordance with the invention is preferably supplied in the manner of pneumatic bellows 38 which are pressurized with air or inert gas.

Devices are supplied to limit the extension and/or compression of the pneumatic bellows 38, such as hydraulic shock absorbers 48, albeit nylon straps or chain limiters could be alternatives when economy is an overriding factor.

The trailing beam suspension 20 in accordance with the invention can be integrated into a vehicle frame such as a turntable steering provision (not shown).

The trailing beam suspension 20 in accordance with the invention might further comprise an air control system (not shown), for controlling the pressure in the pneumatic bellows 38 for adjustment of the load that can be carried thereby, as well as to raise and lower the trailer (vehicle) deck height and set the new ride height for trailer (vehicle) operation.

The air control system can dump the height of the deck of the trailer (vehicle) to its lowest elevation for ease of loading at the rear of the trailer.

The trailing arm-beams 32 can be configured with a fore portion extending forward of the fulcrum defined by the bolt extending through the bushing 72 bolted to the hanger 34 (this is not shown). That way, a second and lifting pneumatic air bellows 38 can be added between that fore portion of the trailing arm-beam 32 and the box frame undercarriage of the trailer (vehicle). That way, the load-bearing pneumatic air bellows 38 can be exhausted (to be slack) and the lifting pneumatic air bellows 38 can pressurized (to expand) and lift the axle 25 up for non-use.

Moreover, the trailing beam suspension 20 in accordance with the invention can be assembled/configured on the trailer with an integrated onboard air compressor and air management system (not shown).

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. A pneumatic trailing beam suspension system for land vehicles, including trailers; comprising:

a tubular axle having a characteristic outside diameter and being made of a weldable metallic material;

left and right air springs;

left and right trailing arm-beams, each extending between (1) a leading, eye-formed end adapted for housing a bushing adapted to be bolted to a hanger hanging from an undercarriage of the land vehicle, or an intermediate structure thereto such as a sliding undercarriage being slidable and having multiple fixable longitudinal positions, and, (2) a trailing end formed with an air-spring seat adapted for seating one of the respective air springs;

left and right landing pads made of weldable metallic material, each landing pad having a box foot having a characteristic planar geometry outline and extending upwardly to an upper semi-circular concave raceway upper end sized and configured with an inside diameter adapted to closely match the characteristic outside diameter of the axle;

the left and right landing pads being welded to the axle at a selected spacing whereby each box foot projects radially outward on a common radial axis;

each of the left and right trailing arm-beams having an upper surface intermediate the leading and trailing ends formed with a recessed pocket seat sized and configured with a planar geometry outline counterpart to the characteristic geometry of the respective box foot of the respective landing pad;

the axle and left and right trailing arm-beams being assembled together with the landing pads previously welded to the axle thereafter, during assembly, being landed in the respective pocket seats of the respective trailing arm-beams; and a plurality of bolts clamping the axle to the left and right trailing arm-beams whereby the close fit between the each transversely spaced left and right box foot of the respective transversely spaced landing pads, and, each transversely spaced left and right pockets seat of the respective transversely spaced trailing arm-beams resists twisting of the axle due to external impulses including brake torsion loading, or G-force impacts from over-the-road surface roughness.

2. The pneumatic trailing beam suspension system of claim 1, further comprising:

left and right fixed dowel pins extending upright from a bottom surface of the respective left and right recessed pockets in each of the left and right trailing arm-beams; and each left and right box foot has a bottom wall and a dowel hole in the bottom sized and disposed to receive the respective left and right dowel pin for purposes of not only locating during initial assembly but also additionally to resist twisting of the axle due to external impulses including brake torsion loading, or G-force impacts from over-the-road surface roughness.

3. The pneumatic trailing beam suspension system of claim 1, wherein:

each landing pad comprises a monolithic piece of steel;

each box foot has a quadrilateral footprint;

each box foot has a bottom wall whereby each box foot is a solid block or plate of steel, excluding the option of bottom hole for receiving a dowel pin; and each landing pad being welded to the axle at respective left and right dispositions along semi-circular concave raceways.

4. The pneumatic trailing beam suspension system of claim 3, wherein:

the axle comprises a monolithic hollow tube defining a sidewall;

each landing pad extending between inboard and outboard sidewalls tapering inward from the respective box foot to terminate in and being spaced by fore and aft transverse edges whereby each landing pad is sized and configured such that the transverse edges rest against or near longitudinally-spaced fore and aft strips on the sidewall of the axle whereby, if the axle sidewall is imagined as an imaginary clock dial, then the spaced fore and aft strips are spaced on opposite sides of six o'clock on that imaginary clock dial; and each landing pad further being welded to the axle at the respective fore and aft transverse edges.

5. The pneumatic trailing beam suspension system of claim 3, wherein:

each trailing arm-beam comprises a leading steel I-beam portion and a trailing steel plate portion;

each I-beam portion extends from the eye-formed leading end tot a trailing end;

each plate portion having a fore portion overlapping the trailing end of the I-beam portion but terminating short of the eye-formed leading end, whereby each plate portion is formed with a through aperture in the characteristic planar geometry outline of respective box foot, whereby the seat pocket as a whole is recessed below an upper surface of the plate portion, and, whereby the seat pocket has a bottom wall that is actually a top surface of an upper wall the I-beam portion.

6. The pneumatic trailing beam suspension system of claim 5, further comprising:

left and right fixed dowel pins extending upright from a bottom surface of the respective left and right recessed pockets in each of the left and right trailing arm-beams; and each left and right box foot has a bottom wall and a dowel hole in the bottom sized and disposed to receive the respective left and right dowel pin for purposes of not only locating during initial assembly but also additionally to resist twisting of the axle due to external impulses including brake torsion loading, or G-force impacts from over-the-road surface roughness.

7. The pneumatic trailing beam suspension system of claim 1, wherein:

the bolts comprise U-bolts.

8. The pneumatic trailing beam suspension system of claim 1, wherein:

the bolts comprise straight bolts and an axle-mounting cap.

9. A pneumatic trailing beam suspension system for land vehicles, including trailers; comprising:

a hollow steel tubular axle having a sidewall having a characteristic outside diameter;

left and right air springs;

left and right trailing arm-beams, each extending between (1) a leading, eye-formed end adapted for housing a bushing adapted to be bolted to a hanger hanging from an undercarriage of the land vehicle, or an intermediate structure thereto such as a sliding undercarriage being slidable and having multiple fixable longitudinal positions, and, (2) a trailing end formed with an air-spring seat adapted for seating one of the respective air springs;

left and right steel monolithic landing pads, each landing pad having a box foot having a characteristic planar geometry outline and extending upwardly to an upper semicircular concave raceway upper end sized and configured with an inside diameter adapted to closely match the characteristic outside diameter of the axle and having an angular extent to receive about a lower quarter of the sidewall of the axle;

the left and right landing pads being welded to the axle at a selected left and right dispositions whereby each box foot projects radially outward on a common radial axis;

each of the left and right trailing arm-beams having an upper surface intermediate the leading and trailing ends formed with a recessed pocket seat sized and configured with a planar geometry outline counterpart to the characteristic geometry of the respective box foot of the respective landing pad;

the axle and trailing arm-beams being initially assembled together with the landing pads being landed in the respective pocket seats of the respective trailing arm-beams; and a plurality of bolts clamping the axle to the left and right trailing arm-beams whereby the close fit between the each transversely spaced left and right box foot of the respective transversely spaced landing pads, and, each transversely spaced left and right pockets seat of the respective transversely spaced trailing arm-beams resists twisting of the axle due to external impulses including brake torsion loading, or G-force impacts from over-the-road surface roughness.

10. The pneumatic trailing beam suspension system of claim 9, wherein:

the bolts comprise straight bolts and an axle-mounting cap.

11. The pneumatic trailing beam suspension system of claim 9, wherein:

the bolts comprise U-bolts.

12. The pneumatic trailing beam suspension system of claim 11, further comprising:

left and right fixed dowel pins extending upright from a bottom surface of the respective left and right recessed pockets in each of the left and right trailing arm-beams; and each left and right box foot has a bottom wall and a dowel hole in the bottom sized and disposed to receive the respective left and right dowel pin for purposes of not only locating during initial assembly but also additionally to resist twisting of the axle due to external impulses including brake torsion loading, or G-force impacts from over-the-road surface roughness.

13. The pneumatic trailing beam suspension system of claim 12, wherein:

each trailing arm-beam comprises a leading steel I-beam portion and a trailing steel plate portion;

each I-beam portion extends from the eye-formed leading end to a trailing end;

each plate portion having a fore portion overlapping the trailing end of the I-beam portion but terminating short of the eye-formed leading end, whereby each plate portion is formed with a through aperture in the characteristic planar geometry outline of respective box foot, whereby the seat pocket as a whole is recessed below an upper surface of the plate portion, and, whereby the seat pocket has a bottom wall that is actually a top surface of an upper wall the I-beam portion.

14. A heavy duty trailing beam suspension system for cargo transportation vehicles; comprising:

a hollow steel tubular axle having a sidewall having a characteristic outside diameter:

left and right air springs;

left and right trailing arm-beams, each extending between a leading, eye-formed end adapted for housing a hanger bushing, and, a trailing end formed with an air-spring seat adapted for seating one of the respective air springs;

left and right steel landing pads, each landing pad having a box foot having a characteristic planar geometry outline and extending upwardly to an upper semicircular concave raceway upper end sized and configured with an inside diameter adapted to closely match the characteristic outside diameter of the axle;

the left and right landing pads being welded along the raceways to the sidewall of the axle at spaced left and right dispositions whereby each box foot projects radially outward on a common radial axis;

each of the left and right trailing arm-beams having an upper surface intermediate the leading and trailing ends formed with a recessed pocket seat sized and configured for receiving and assembling with a respective box foot of a respective landing pad; and a plurality of bolts clamping the axle to the left and right trailing arm-beams whereby an axle with a relatively thinner sidewall thickness can be utilized.

15. The heavy duty trailing beam suspension system for cargo transportation vehicles of claim 14, wherein:

the bolts comprise straight bolts and an axle-mounting cap.

16. The heavy duty trailing beam suspension system for cargo transportation vehicles of claim 14, wherein:

the bolts comprise outwardly tapered U-bolts that are wider at the base.

17. The heavy duty trailing beam suspension system for cargo transportation vehicles of claim 14, further comprising:

left and right fixed dowel pins extending upright from a bottom surface of the respective left and right recessed pockets in each of the left and right trailing arm-beams; and each left and right box foot has a bottom wall and a dowel hole in the bottom sized and disposed to receive the respective left and right dowel pin for purposes of not only locating during initial assembly but also to resist twisting of the axle due to external impulses including brake torsion loading, or G-force impacts from over-the-road surface roughness.

18. The heavy duty trailing beam suspension system for cargo transportation vehicles of claim 17, wherein:

each trailing arm-beam comprises a leading steel I-beam portion and a trailing steel plate portion;

each I-beam portion extends from the eye-formed leading
end to a trailing end;

each plate portion having a fore portion overlapping the
trailing end of the I-beam portion but terminating short
of the eye-formed leading end, whereby each plate
portion is formed with a through aperture in the char-
acteristic planar geometry outline of respective box
foot, whereby the seat pocket as a whole is recessed
below an upper surface of the plate portion, and,
whereby the seat pocket has a bottom wall that is
actually a top surface of an upper wall the I-beam
portion.

19. The heavy duty trailing beam suspension system for
cargo transportation vehicles of claim 18, wherein:

each landing pad comprises a monolithic piece of steel;
and each box foot has a bottom wall;

each bottom wall has at least plate steel thickness.

20. The heavy duty trailing beam suspension system for
cargo transportation vehicles of claim 19, wherein:

each landing pad extends between inboard and outboard
sidewalls tapering inward from the respective box foot
to terminate in and being spaced by fore and aft
transverse edges whereby each landing pad is sized and
configured such that the transverse edges rest against or
near longitudinally-spaced fore and aft strips on the
sidewall of the axle whereby, if the axle sidewall is
imagined as an imaginary clock dial, then the spaced
fore and aft strips are spaced on opposite sides of six
o'clock on that imaginary clock dial; and each landing pad further being welded to the axle at the
respective fore and aft transverse edges.

* * * * *